(12) United States Patent
Hanayama

(10) Patent No.: US 11,509,790 B2
(45) Date of Patent: Nov. 22, 2022

(54) ELECTRONIC APPARATUS ALLOWING RUNNING OF EXTENDED APP AND COMPUTER READABLE NON-TRANSITORY RECORDING MEDIUM STORING PROGRAM

(71) Applicant: KYOCERA Document Solutions Inc., Osaka (JP)

(72) Inventor: Tatsuya Hanayama, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/185,073

(22) Filed: Feb. 25, 2021

(65) Prior Publication Data
US 2021/0274052 A1  Sep. 2, 2021

(30) Foreign Application Priority Data
Feb. 28, 2020  (JP) .............................. JP2020-034187

(51) Int. Cl.
*H04N 1/00* (2006.01)
*G06F 8/61* (2018.01)
*G06F 9/54* (2006.01)

(52) U.S. Cl.
CPC ............ *H04N 1/0097* (2013.01); *G06F 8/61* (2013.01); *G06F 9/541* (2013.01)

(58) Field of Classification Search
CPC .................................................. H04N 1/0097
USPC ......................................................... 358/1.16
See application file for complete search history.

(56) References Cited

U.S. PATENT DOCUMENTS

| | | | | |
|---|---|---|---|---|
| 2007/0008573 | A1* | 1/2007 | Yamada | H04N 1/00411 358/448 |
| 2015/0373223 | A1* | 12/2015 | Furushige | H04N 1/00973 358/1.13 |
| 2017/0223208 | A1* | 8/2017 | Okamoto | H04N 1/00411 |

FOREIGN PATENT DOCUMENTS

WO     2015-182303     12/2015

\* cited by examiner

*Primary Examiner* — Jacky X Zheng
(74) *Attorney, Agent, or Firm* — Lex IP Meister, PLLC

(57) ABSTRACT

An image forming apparatus provided with a storage and a random access memory (RAM) includes an extended app manager that performs management of an extended app as an application for implementing a function other than the standard functions of the image forming apparatus in itself, and an extended app platform as a platform of the extended app. The extended app manager stores a source for extended app application program interface (API) that is a program for an extended app API as an API usable to the extended app, in a region for dynamic addition that is a region provided on the storage for purposes of dynamic addition of the source for extended app API, and the extended app platform uses the source for extended app API in the region for dynamic addition to load the extended app API on the RAM.

4 Claims, 7 Drawing Sheets

ELECTRONIC APPARATUS ALLOWING RUNNING OF EXTENDED APP AND COMPUTER READABLE NON-TRANSITORY RECORDING MEDIUM STORING PROGRAM

INCORPORATION BY REFERENCE

This application is based upon, and claims the benefit of priority from, corresponding Japanese Patent Application No. 2020-034187 filed in the Japan Patent Office on Feb. 28, 2020, the entire contents of which are incorporated herein by reference.

BACKGROUND

Field of the Invention

The present disclosure relates to an electronic apparatus allowing the running of an extended app as an application for implementing a function other than standard functions, and a computer readable non-transitory recording medium storing a program.

Description of Related Art

Known as a typical electronic apparatus is an image forming apparatus that includes a standard app as an application for implementing a standard function of the image forming apparatus, an extended app as an application for implementing a function other than the standard functions of the image forming apparatus, and an extended function service providing the extended app with a function of extending a standard function of the image forming apparatus without using a standard app. The extended app runs on a platform of the extended app. The platform of the extended app provides an application program interface (API) usable to the extended app.

SUMMARY

An electronic apparatus according to the present disclosure is an electronic apparatus provided with a storing device and a memory and including an extended app manager that performs management of an extended app as an application for implementing a function other than standard functions of the electronic apparatus, and an extended app platform as a platform of the extended app. The extended app manager stores a program for extended app application program interface (API) that is a program for an extended app API as an API usable to the extended app, in a region for dynamic addition that is a region provided on the storing device for purposes of dynamic addition of the program for extended app API, and the extended app platform uses the program for extended app API in the region for dynamic addition to load the extended app API on the memory.

A computer readable non-transitory recording medium according to the present disclosure stores a program that causes an electronic apparatus provided with a storing device and a memory to implement an extended app manager that performs management of an extended app as an application for implementing a function other than standard functions of the electronic apparatus, and an extended app platform as a platform of the extended app. The extended app manager stores a program for extended app API that is a program for an extended app API as an API usable to the extended app, in a region for dynamic addition that is a region provided on the storing device for purposes of dynamic addition of the program for extended app API, and the extended app platform uses the program for extended app API in the region for dynamic addition to load the extended app API on the memory.

DETAILED DESCRIPTION

In the following, description is made on an embodiment of the present disclosure with reference to the accompanying drawings.

First of all, description is made on the configuration of an image forming apparatus as an electronic apparatus according to an embodiment of the present disclosure.

Figure 1:
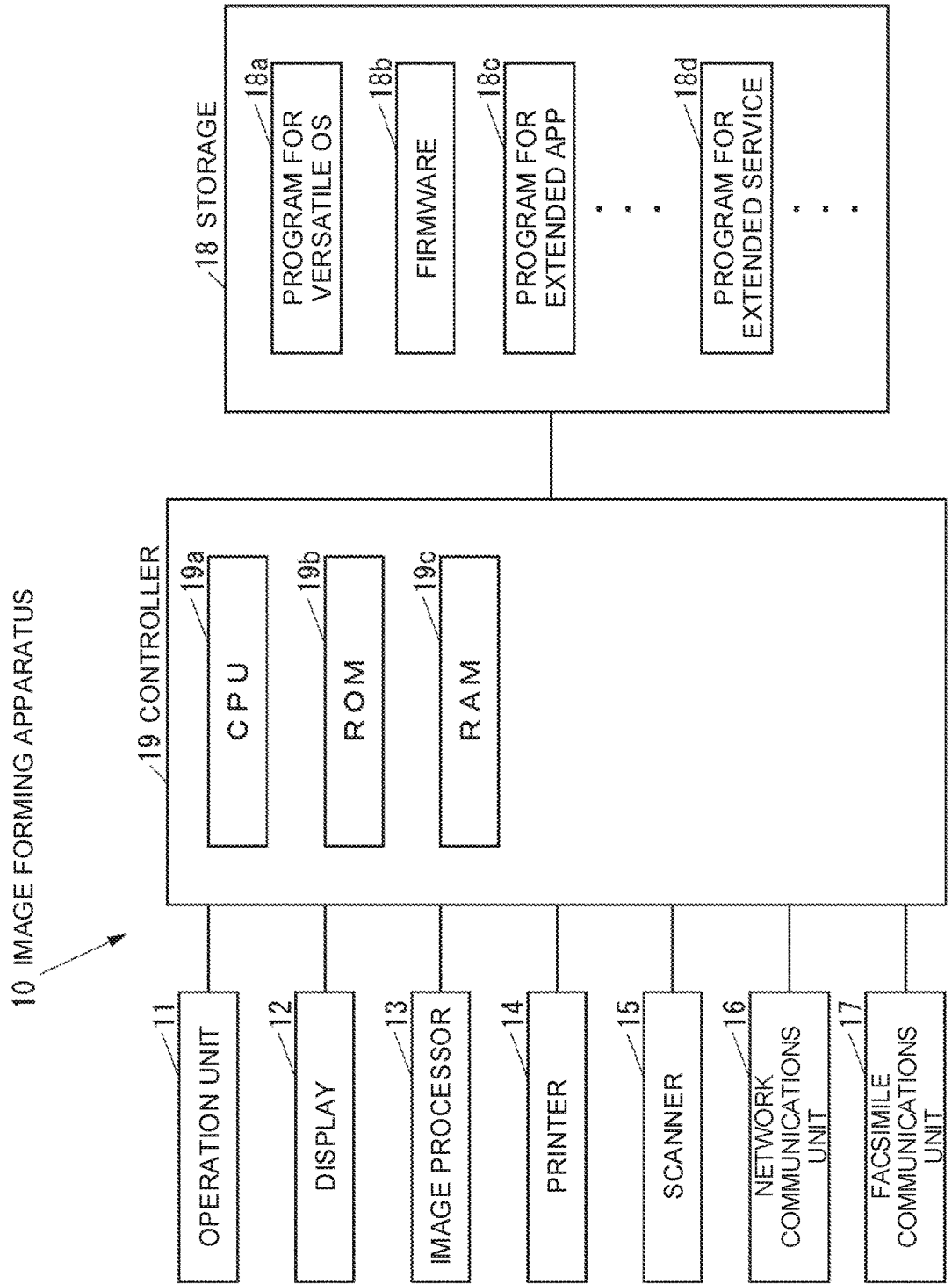
FIG. 1 is a block diagram of hardware of an image forming apparatus according to an embodiment of the present disclosure.

FIG. 1 is a block diagram of the hardware of an image forming apparatus 10 according to the present embodiment.

As illustrated in FIG. 1, the image forming apparatus 10 is the multifunction peripheral (MFP), which includes an operation unit 11 that is an operating device, such as a button, to input various operations, a display 12 that is a displaying device, such as a liquid crystal display (LCD), to display various types of information, an image processor 13 that is an image processing device, such as a graphics processing unit (GPU), to perform, on image data, various types of image processing including enlargement, reduction, density adjustment, gradation adjustment, and image improvement, a printer 14 that is a printing device to print an image on a recording medium such as a sheet of paper, a scanner 15 that is a reading device to read an image from an original document, a network communications unit 16 that is a communicating device to communicate with an external device across a network such as a local area network (LAN) and the Internet or not across any network but directly in a wired or wireless manner, a facsimile communications unit 17 that is a facsimile device to perform facsimile communications with an external facsimile machine (not illustrated) through a telecommunications line such as a public telephone line, a storage 18 that is a non-volatile storing device, such as a semiconductor memory and a hard disk drive (HDD), to store various types of information, and a controller 19 that controls the entire image forming apparatus 10.

The storage 18 stores a program 18a that is a program for a versatile operating system (OS), such as Linux (registered_ trademark), for controlling individual hardware components of the image forming apparatus 10 (hereinafter referred to as "program for versatile OS").

The storage 18 stores a firmware 18b of the image forming apparatus 10.

The storage 18 stores a program 18c that is a program for an extended app as an application for implementing a function other than the standard functions of the image forming apparatus 10 (hereinafter referred to as "program for extended app"). The storage 18 is capable of storing a program for extended app for each extended app.

The storage 18 stores a program 18d that is a program for an extended service offering, to an extended app, a service using the versatile OS without using a standard app as an application for implementing a standard function of the image forming apparatus 10 (hereinafter referred to as "program for extended service"). The storage 18 is capable of storing a program for extended service for each extended service.

The controller 19 includes, for instance, a central processing unit (CPU) 19a, a read only memory (ROM) 19b storing programs and various types of data, and a random access memory (RAM) 19c as a memory used as a working area of the CPU 19a. The CPU 19a executes a program stored in the storage 18 or the ROM 19b.

Figure 2:
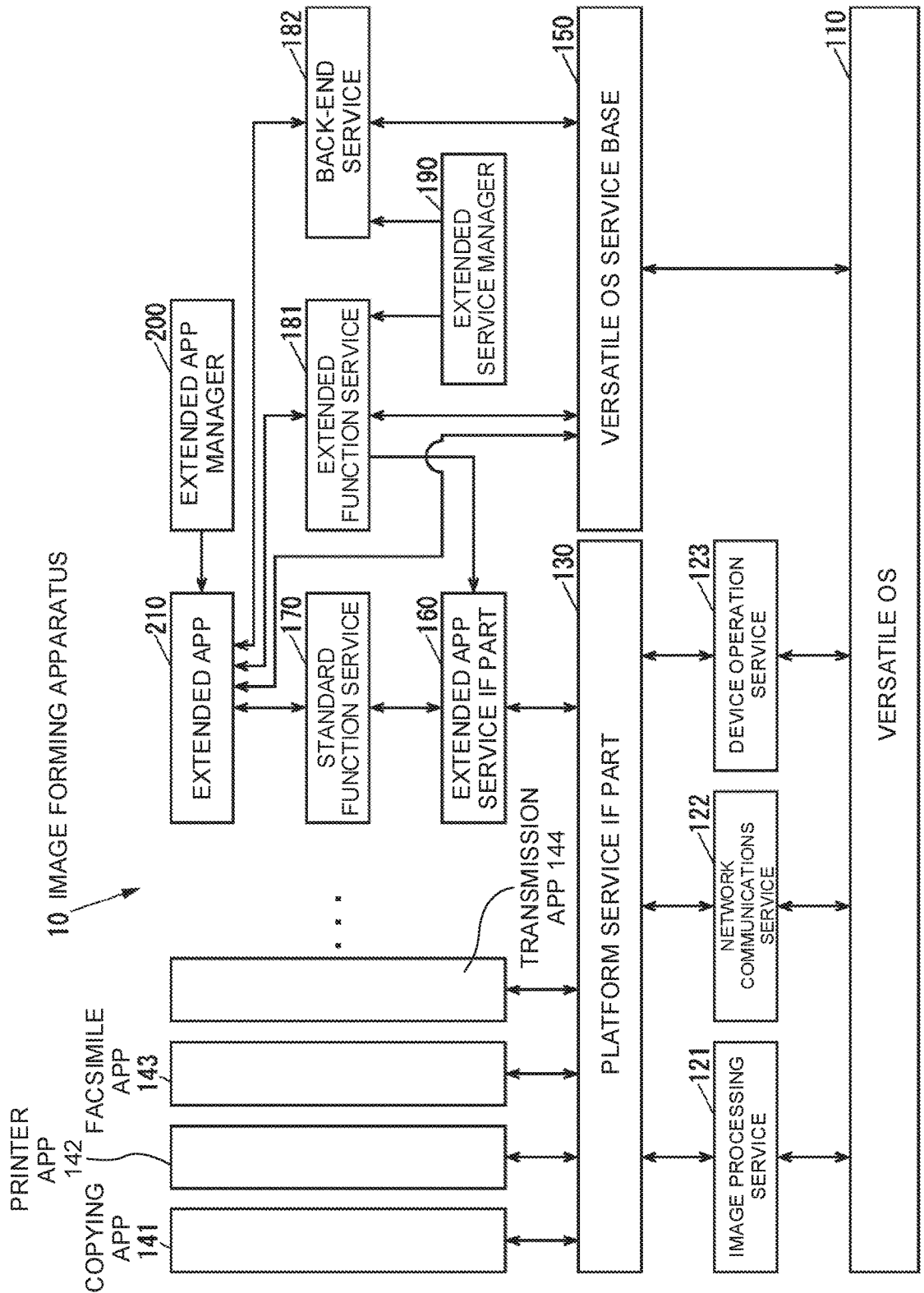
FIG. 2 is a block diagram of a control system of the image forming apparatus illustrated in FIG. 1.

The controller 19 implements a control system illustrated in FIG. 2 by the execution of a program stored in the storage 18 or the ROM 19b.

FIG. 2 is a block diagram of a control system of the image forming apparatus 10.

As illustrated in FIG. 2, the controller 19 executes the program for versatile OS 18a (see FIG. 1) so as to implement a versatile OS 110.

The controller 19 executes the firmware 18b (see FIG. 1) so as to implement an image processing service 121 that runs on the versatile OS 110 to offer a service related to image processing, a network communications service 122 that runs on the versatile OS 110 to offer a service related to communications across a network, and a device operation service 123 that runs on the versatile OS 110 to offer a service operating the individual hardware components of the image forming apparatus 10. The image processing service 121, the network communications service 122, and the device operation service 123 each control the individual hardware components of the image forming apparatus 10 through the versatile OS 110.

The image processing service 121 may offer a service storing the image data, which has been read from an original document with the scanner 15 after setting the resolution, colors, and the like, in the storage 18, and causing the image processor 13 to perform image processing on the image data as stored in the storage 18. The image processing service 121 may offer a service drawing, based on a file, the image data to be printed by the printer 14. The image processing service 121 may offer a service performing image processing, such as enlargement, reduction, rotation, color conversion, noise removal, format conversion, character recognition, and watermark recognition, on image data acquired from an extended app, image data read from an original document with the scanner 15, or image data stored in the storage 18.

The network communications service 122 may offer a service using various protocols such as the Transmission Control Protocol/Internet Protocol (TCP/IP) and the User Datagram Protocol (UDP) to perform transmission and reception of a file, streaming, and transmission and reception of authentication data through the network communications unit 16. For instance, the network communications service 122 can transmit and receive image data read from an original document with the scanner 15 or a file stored in the storage 18. It is also possible for the network communications service 122 to transmit and receive image data subjected to facsimile transmission and reception by the facsimile communications unit 17, to transmit and receive the result of user authentication by a user authentication unit for authenticating a user based on an IC card or biometric authentication if such user authentication unit exists on the image forming apparatus 10, and to transmit and receive video data generated by a camera if the camera exists on the image forming apparatus 10. In addition, the network communications service 122 can transmit and receive the state of each component of the image forming apparatus 10, the result of the calling of a function of each component, and the like.

The device operation service 123 may offer a service performing a process for drawing on the display 12, driving the printer 14, controlling the facsimile communications unit 17, conducting user authentication, or acquiring the status of individual hardware components of the image forming apparatus 10. The device operation service 123 may offer a service storing image data read from an original document with the scanner 15 in the storage 18, a service drawing an image on a browser displayed on the display 12, a service transmitting image data to the printer 14 to make an image formed, or a service subjecting image data stored in the storage 18 to facsimile transmission by the facsimile communications unit 17. The device operation service 123 may offer a service causing an optional device such as a finisher to perform a process for bookbinding or stapling if the optional device exists on the image forming apparatus 10, a service causing a user authentication unit for authenticating a user based on an IC card or biometric authentication to perform user authentication if such user authentication unit exists on the image forming apparatus 10, or a service causing a camera to generate video data and calling functions including gaze detection based on the video data generated by the camera if the camera exists on the image forming apparatus 10. The device operation service 123 may offer a service performing specific control of the individual hardware components of the image forming apparatus 10, such as driving of one of motors of a conveyance part of the printer 14. The device operation service 123 may offer a service acquiring the state of each component of the image forming apparatus 10.

The controller 19 executes the firmware 18b so as to implement a platform service interface (IF) part 130 that provides an interface for calling the image processing service 121, the network communications service 122, and the device operation service 123.

The controller 19 executes the firmware 18b so as to implement a standard app. The standard app runs on the platform service IF part 130 to use the individual hardware components of the image forming apparatus 10. The controller 19 implements, for instance, a copying app 141 as a standard app for realizing the copying, in which an image is read from an original document with the scanner 15 and the read image is printed by the printer 14 according to the instructions as input to the operation unit 11, a printer app 142 as a standard app for printing, by the printer 14, an image based on such data as described in a page description language (PDL) that is received by the network communications unit 16, a facsimile app 143 as a standard app for reading an image from an original document with the scanner 15 and transmitting the read image by the facsimile communications unit 17 according to the instructions as input to the operation unit 11, and a transmission app 144 as a standard app for reading an image from an original document with the scanner 15 and transmitting the read image by the network communications unit 16 according to the instructions as input to the operation unit 11. The printer app 142 may print, by the printer 14, an image based on a file stored in the storage 18, according to the instructions as input to the operation unit 11. The facsimile app 143 may transmit, by the facsimile communications unit 17, an image based on a file received by the network communications unit 16, print, by the printer 14, an image received by the facsimile communications unit 17 or store an image received by the facsimile communications unit 17 in the storage 18.

The controller 19 executes the firmware 18b so as to implement a versatile OS service base 150 that offers a service using the versatile OS 110 without the intervention of the platform service IF part 130. The versatile OS service base 150 may offer a service adding a function to the versatile OS 110 by, for instance, installing a control program such as a device driver and a script on the versatile OS 110.

The controller 19 executes the firmware 18b so as to implement an extended app service IF part 160 that provides an interface for using the platform service IF part 130 from the extended app side.

The controller 19 executes the firmware 18b so as to implement a standard function service 170 as a service using a standard app to provide an extended app with a standard function of the image forming apparatus 10. The standard function service 170 uses a standard app through the extended app service IF part 160. For instance, an extended app can use the standard function service 170 to display a screen for the start of copying by the copying app 141 on the display 12. In addition, an extended app can use the standard function service 170 to cause the printer app 142 to print various types of job data and files acquired by the extended app in itself or designated through the operation unit 11. Furthermore, an extended app can use the standard function service 170 to acquire image data designated through the operation unit 11 out of the image data of facsimiles received by the facsimile app 143 or cause the facsimile app 143 to transmit a file designated through the operation unit 11.

The controller 19 executes the program for extended service 18d (see FIG. 1) so as to implement an extended service as a service providing a function other than the standard functions of the image forming apparatus 10. For instance, the controller 19 implements an extended function service 181 as an extended service offering, to an extended app, a service using the platform service IF part 130 without using a standard app, and using the versatile OS service base 150 to use the versatile OS 110, and a back-end service 182 as an extended service offering, to an extended app, a service using the versatile OS service base 150 to use the versatile OS 110 without using the platform service IF part 130. The extended function service 181 uses the platform service IF part 130 through the extended app service IF part 160. The controller 19 can implement at least one extended function service apart from the extended function service 181. The controller 19 can implement at least one back-end service apart from the back-end service 182.

An extended function service refers to a service providing an extended app with a function of extending a standard function of the image forming apparatus 10.

A back-end service refers to a service that works on the back end. The back-end service is a service providing a function that is neither a standard function of the image forming apparatus 10 nor a function of extending a standard function of the image forming apparatus 10. Examples of the back-end service include a service providing a function of monitoring the image forming apparatus 10, a service providing a function of monitoring the entire system, which is constituted of a plurality of image forming apparatuses, a service providing a function of monitoring a specified server, a service providing a function of collecting information about a counter in the image forming apparatus 10 that indicates the number of printed sheets, and the like from the image forming apparatus 10 and converting the collected information into information whose format is understandable to a person, and a service providing a function of changing the format of information output from the image forming apparatus 10 from a format for an old type interface into a format for a new type interface.

The controller 19 executes the firmware 18b so as to implement an extended service manager 190 that performs management of an extended service, such as booting, starting, and stopping of an extended service. The extended service manager 190 monitors the state of an extended service and of the versatile OS service base 150.

The controller 19 executes the firmware 18b so as to implement an extended app manager 200 that performs management of an extended app, such as booting, starting, and stopping of an extended app.

The controller 19 executes the program for extended app 18c (see FIG. 1) so as to implement an extended app 210. The controller 19 can implement at least one extended app apart from the extended app 210. An extended app is an application directly used by a user, and includes a user interface. The user is able to use a function provided by an extended app by operating the user interface of the extended app. The extended app 210 may be an optical character recognition (OCR) app, a monitoring camera app or any other practical app, such as an app for watermark forming, billing, list of members management, slip management, contract management, name card management, portable document format (PDF) file creation, account book management, group management or the like, or a management app such as an installer app for performing addition and change of a device driver, a firmware, and the like on the versatile OS 110. The extended app 210 is capable of calling the standard function service 170 to use a standard app and use thereby the versatile OS 110, calling an extended service to use the versatile OS 110 without using a standard app, and directly calling the versatile OS service base 150 to use the versatile OS 110.

Figure 3:
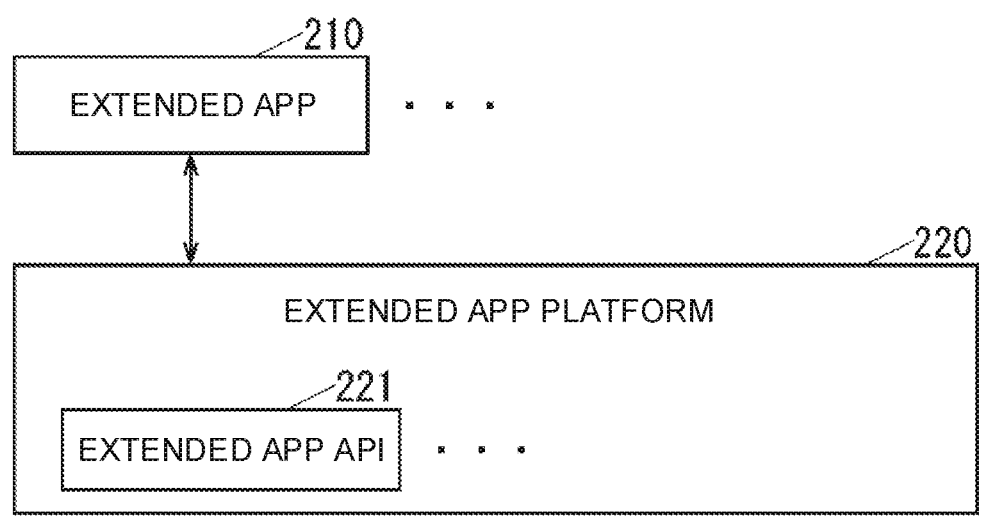
FIG. 3 is a block diagram of an extended app platform as a platform of an extended app in FIG. 2.

FIG. 3 is a block diagram of a platform (hereinafter referred to as "extended app platform") 220 of the extended app 210 in FIG. 2.

The extended app 210 runs on the extended app platform 220. The extended app manager 200 constitutes part of the extended app platform 220.

The extended app 210 is the web application, for which Java (registered trademark) is used. The extended app 210 includes a Java program that runs on the server side as the back end, and a web resource for the user interface (UI) display with a browser as the front end.

The extended app platform 220 is capable of providing an extended app application program interface (API) 221 that is an API usable to the extended app 210 on each of the back end and the front end. The extended app platform 220 can provide at least one extended app API apart from the extended app API 221. The extended app API 221 includes a Java program and a web resource.

A Java program and a web resource each for an extended app API (hereinafter collectively referred to as "source for extended app API") are provided along with a program for extended app with respect to at least some extended app APIs. The controller 19 executes the firmware 18b so as to implement the extended app platform 220, which excludes at least some extended app APIs.

The next description is made on a method of generating a package (PKG) file for installing an extended app.

A developer of programs for extended app can use a computer (not illustrated) such as a personal computer (PC) to generate a PKG file for installing an extended app. The generation of a PKG file for installing an extended app is performed by using a software development kit (SDK) released from a manufacturer of the image forming apparatus 10. In the SDK, sources for extended app API of various extended app APIs are preserved.

Figure 4:
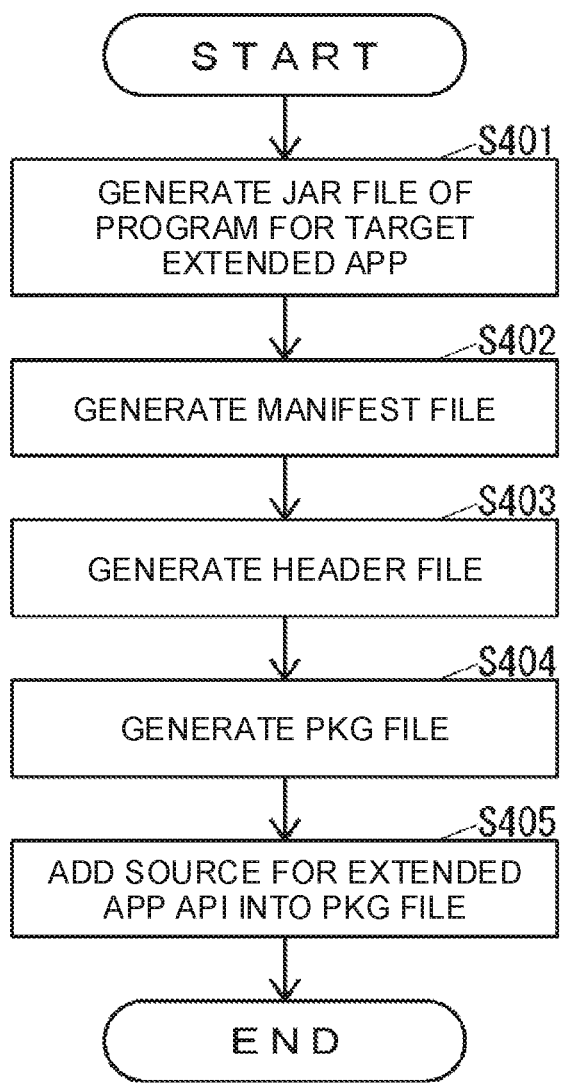
FIG. 4 is a flowchart of an operation of a computer when a package (PKG) file for installing the extended app in FIG. 2 is generated.

FIG. 4 is a flowchart of an operation of a computer when a PKG file for installing an extended app is generated.

A developer of programs for extended app can instruct a computer to generate a PKG file for installing an extended app. During such instruction, identification information on the source for extended app API of the extended app API to be used by the program for a target extended app is designated. If instructed to generate a PKG file for installing an extended app, the computer executes the SDK so as to perform the operation illustrated in FIG. 4.

As illustrated in FIG. 4, the computer generates a Java archive (JAR) file of the program for the target extended app (step S401). The JAR file is an executable file including the Java program and the web resource of the target extended app.

After the process in step S401, the computer generates a manifest file indicating what file the JAR file as generated in step S401 is (step S402).

Then, the computer generates a header file indicating the identification information on the source for extended app API, which information has been designated during the instruction to generate a PKG file for installing an extended app (step S403). The header file is encrypted with a specified encryption key.

After the process in step S403, the computer generates a PKG file having the JAR file generated in step S401, the manifest file generated in step S402, and the header file generated in step S403 packed therein (step S404).

Then, the computer adds the source for extended app API, on which the identification information has been designated during the instruction to generate a PKG file for installing an extended app, into the PKG file generated in step S404 (step S405), and ends the operation illustrated in FIG. 4.

The next description is made on an operation of the image forming apparatus 10 when an extended app is installed.

Figure 5:
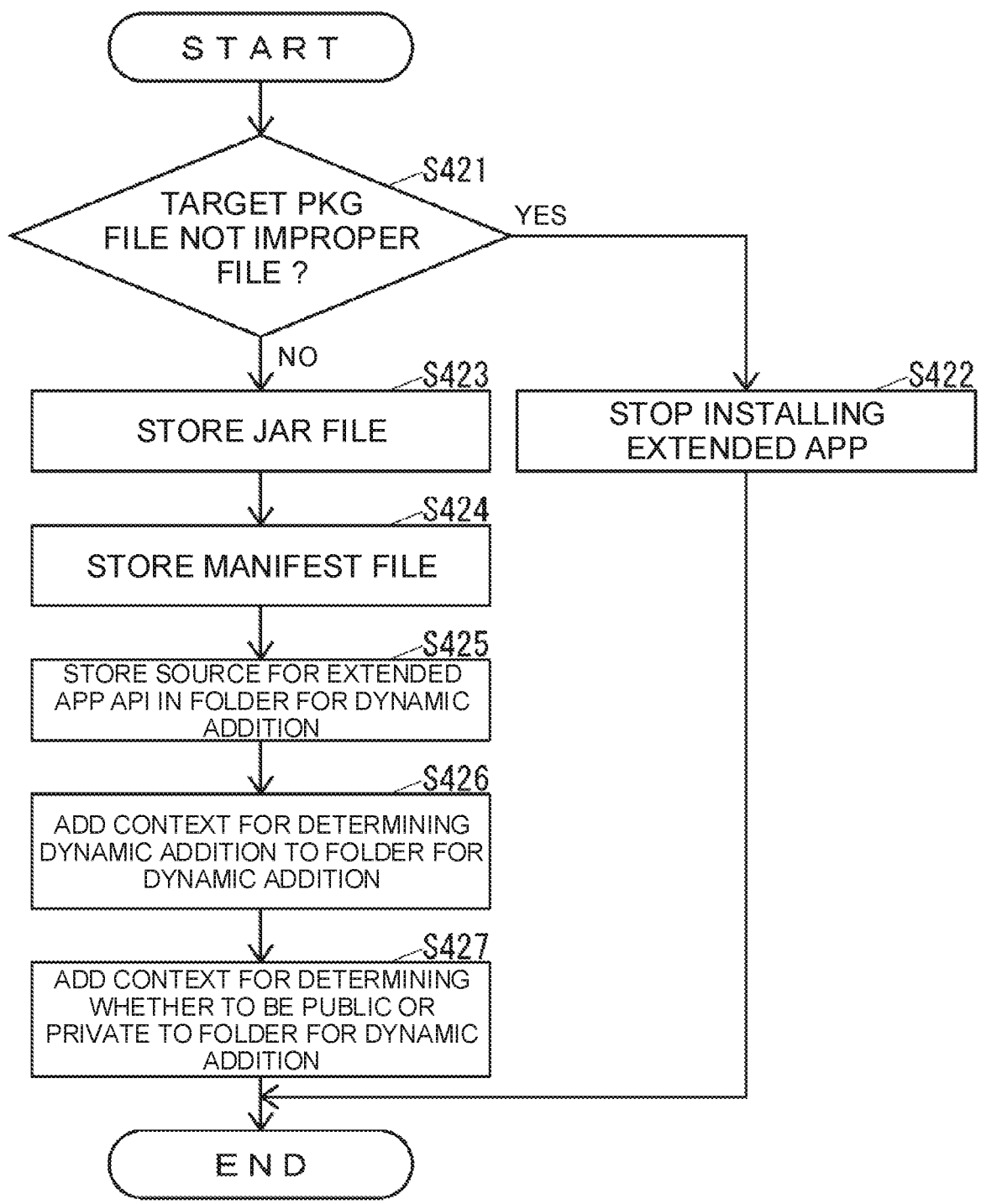
FIG. 5 is a flowchart of an operation of the image forming apparatus illustrated in FIG. 1 when an extended app is installed.

FIG. 5 is a flowchart of an operation of the image forming apparatus 10 when an extended app is installed.

The controller 19 of the image forming apparatus 10 performs the operation illustrated in FIG. 5 if it is instructed to install an extended app using the PKG file as generated according to the operation illustrated in FIG. 4.

As illustrated in FIG. 5, the extended app manager 200 analyzes the header file included in a target PKG file so as to determine whether the target PKG file is not an improper file (step S421). The extended app manager 200 determines that the target PKG file is an improper file if information not approved by the manufacturer of the image forming apparatus 10 is included in the header file or information designated by the manufacturer of the image forming apparatus 10 is not included in the header file, for instance. Further, the extended app manager 200 determines that the target PKG file is an improper file if the target PKG file includes a source for extended app API other than the source for extended app API, which is specified by the identification information included in the header file. The extended app manager 200 is provided with a decryption key for the header file.

If determining, in step S421, that the target PKG file is an improper file, the extended app manager 200 stops the installation of an extended app using the target PKG file (step S422), and ends the operation illustrated in FIG. 5.

If determining, in step S421, that the target PKG file is not an improper file, the extended app manager 200 stores, in the storage 18, the JAR file included in the target PKG file (step S423). In other words, the extended app manager 200 installs an extended app.

After the process in step S423, the extended app manager 200 stores, in the storage 18, the manifest file included in the target PKG file (step S424).

Then, the extended app manager 200 stores the source for extended app API included in the target PKG file, in a specified folder as a region for dynamic addition that is a specified region provided on the storage 18 for purposes of dynamic addition of a source for extended app API (hereinafter referred to as "folder for dynamic addition") (step S425). The folder for dynamic addition is a folder represented by a uniform resource identifier (URI) "[dynamic_context]/[public_context]," for instance.

After the process in step S425, the extended app manager 200 adds, to the folder for dynamic addition, a context indicating that the source for extended app API stored in step S425 has dynamically been added (hereinafter referred to as "context for determining dynamic addition") (step S426).

After the process in step S426, the extended app manager 200 adds, to the folder for dynamic addition, a context indicating whether the source for extended app API stored in step S425 is a source for opening to the public that defines an interface usable from an extended app or a source for closing to the public that does not define an interface usable from an extended app and takes on the implementation of the source for opening to the public (hereinafter referred to as "context for determining whether to be public or private") (step S427), and ends the operation illustrated in FIG. 5.

The next description is made on an operation of the image forming apparatus 10 when a source for extended app API is used to load an extended app API.

Figure 6:
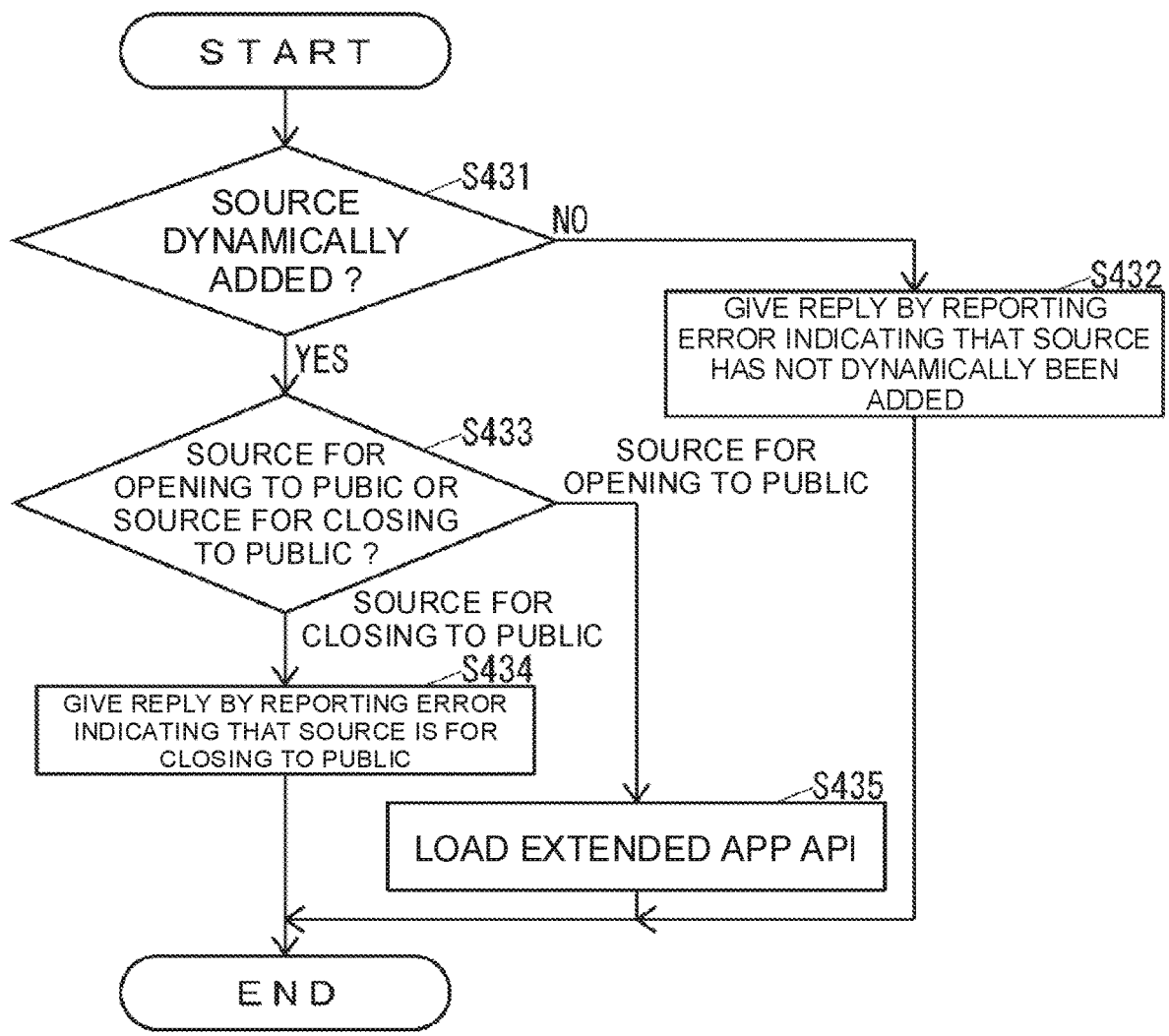
FIG. 6 is a flowchart of an operation of the image forming apparatus illustrated in FIG. 1 when a source for extended app application program interface (API) is used to load an extended app API.

FIG. 6 is a flowchart of an operation of the image forming apparatus 10 when a source for extended app API is used to load an extended app API.

In the extended app as installed according to the operation illustrated in FIG. 5, the URI of the source for extended app API as stored in the storage 18 according to the operation illustrated in FIG. 5 is stored. The stored URI is "[dynamic_context]/[public_context]/[resource name]," for instance. The resource name refers to the name of the source for a target extended app API. If the extended app as installed according to the operation illustrated in FIG. 5 is executed and an extended app API is to be called, the extended app designates the URI of the source for extended app API of the extended app API toward the extended app platform 220. Upon the designation of the URI of the source for extended app API by the extended app, the extended app platform 220 performs the operation illustrated in FIG. 6.

As illustrated in FIG. 6, the extended app platform 220 determines, based on the context for determining dynamic addition on the folder for dynamic addition, whether the source for extended app API, whose URI was designated by the extended app, (hereinafter referred to as "source for target extended app API") has dynamically been added (step S431).

If determining, in step S431, that the source for target extended app API has not dynamically been added, the extended app platform 220 gives a reply to the extended app by reporting an error indicating that the source for target extended app API has not dynamically been added (step S432), and ends the operation illustrated in FIG. 6. Consequently, the extended app is able to perform a specified operation when the source for target extended app API has not dynamically been added.

If determining, in step S431, that the source for target extended app API has dynamically been added, the extended app platform 220 determines, based on the context for determining whether to be public or private on the folder for dynamic addition, whether the source for target extended app API is a source for opening to the public or a source for closing to the public (step S433).

If determining, in step S433, that the source for target extended app API is a source for closing to the public, the extended app platform 220 gives a reply to the extended app by reporting an error indicating that the source for target extended app API is a source for closing to the public (step S434), and ends the operation illustrated in FIG. 6. Consequently, the extended app is able to perform a specified operation when the source for target extended app API is a source for closing to the public.

If determining, in step S433, that the source for target extended app API is a source for opening to the public, the extended app platform 220 uses the source for target extended app API to load the extended app API on the RAM 19c (step S435). Consequently, the extended app is able to use the extended app API loaded in step S435.

After the process in step S435, the extended app platform 220 ends the operation illustrated in FIG. 6.

The next description is made on an operation of the image forming apparatus 10 when an extended app is to be stopped.

Figure 7:
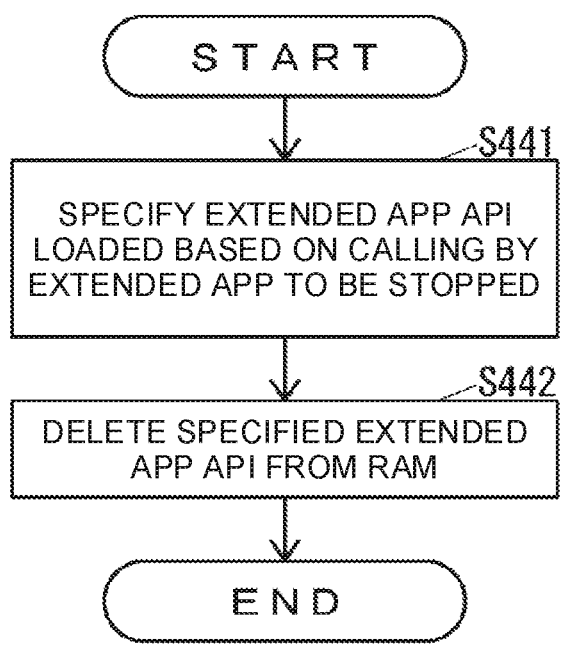
FIG. 7 is a flowchart of an operation of the image forming apparatus illustrated in FIG. 1 when an extended app is to be stopped.

FIG. 7 is a flowchart of an operation of the image forming apparatus 10 when an extended app is to be stopped.

As illustrated in FIG. 7, the extended app platform 220 specifies an extended app API that has been loaded based on the calling by the extended app to be stopped (step S441).

Then, the extended app platform 220 deletes the extended app API specified in step S441 from the RAM 19c (step S442), and ends the operation illustrated in FIG. 7.

As described above, in the image forming apparatus 10, a source for extended app API as a program for extended app API that is a program for an extended app API is stored in a region for dynamic addition (step S425) and the source for extended app API in the region for dynamic addition is used to load the extended app API on the RAM 19c (step S435), so that it is possible to provide the extended app API separately from the firmware 18b of the image forming apparatus 10, which improves the speed at providing an extended app API.

In the image forming apparatus 10, a source for extended app API is included in a PKG file for installing an extended app and, when an extended app is installed (step S423), the source for extended app API in the PKG file for installing an extended app is stored in a region for dynamic addition (step S425), so that it is possible to reduce the possibility of loading an unnecessary extended app API on the RAM 19c, which reduces the possibility of wasting storage regions of the RAM 19c.

In the image forming apparatus 10, an extended app API is loaded on the RAM 19c (step S435) if the extended app API is called by an extended app, so that it is possible to reduce the possibility of loading an unnecessary extended app API on the RAM 19c, which reduces the possibility of wasting storage regions of the RAM 19c.

In the image forming apparatus 10, the extended app API as loaded based on the calling by an extended app is deleted from the RAM 19c (step S442) if the extended app is to be stopped, so that it is possible to reduce the possibility that an extended app API no longer used remains on the RAM 19c, which reduces the possibility of wasting storage regions of the RAM 19c.

In the image forming apparatus 10, it is determined whether a source for extended app API has dynamically been added (step S431) and the source for extended app API, which has dynamically been added, is only used to load an extended app API on the RAM 19c (step S435), so that it is possible to reduce the possibility of loading an improper extended app API.

In the image forming apparatus 10, it is determined whether a source for extended app API is a source for opening to the public or a source for closing to the public (step S433) and the source for extended app API, which is a source for opening to the public, is only used to load an extended app API on the RAM 19c (step S435), so that it is possible to reduce the possibility of improperly loading a source for closing to the public.

Any two or more programs in the present embodiment may be combined into a single program.

While the electronic apparatus according to the present disclosure is an image forming apparatus in the present embodiment, the electronic apparatus according to the present disclosure may be an electronic apparatus other than the image forming apparatus, such as a PC.

What is claimed is:

1. An electronic apparatus provided with a storing device and a memory, the electronic apparatus comprising:

an extended app manager that performs management of an extended app as an application for implementing a function other than standard functions of the electronic apparatus; and an extended app platform as a platform of the extended app, wherein the extended app manager installs the extended app so as to store a program for extended app application program interface (API) usable to the extended app in a predetermined region for dynamic addition, provided on the storing device, and wherein in a case where the extended app installed by the extended app manager calls the extended app API and designates the predetermined region to the extended app platform, the extended app platform uses the program for the extended app API stored in the predetermined region to load the extended app API on the memory so as to be used by the extended app.

2. The electronic apparatus according to claim 1, wherein the extended app manager uses a file for installing the extended app to install the extended app, and wherein the file includes the program for extended app API.

3. The electronic apparatus according to claim 1, wherein the extended app platform deletes the extended app API as loaded based on calling by the extended app from the memory if the extended app is to be stopped.

4. A computer readable non-transitory recording medium storing a program that causes an electronic apparatus provided with a storing device and a memory to implement:
- an extended app manager that performs management of an extended app as an application for implementing a function other than standard functions of the electronic apparatus; and
- an extended app platform as a platform of the extended app,
- wherein the extended app manager installs the extended app so as to store a program for extended app API usable to the extended app in a predetermined region for dynamic addition, provided on the storing device, and
- wherein in a case where the extended app installed by the extended app manager calls the extended app API and designates the predetermined region to the extended app platform, the extended app platform uses the program for the extended app API stored in the predetermined region to load the extended app API on the memory so as to be used by the extended app.

* * * * *